April 3, 1956   J. O. P. HUGHES   2,740,272
FLEXIBLE DRIVES

Filed Aug. 31, 1953   3 Sheets-Sheet 3

United States Patent Office 2,740,272
Patented Apr. 3, 1956

2,740,272

FLEXIBLE DRIVES

John Oliver Philip Hughes, Whetstone, near Leicester, England, assignor to The English Electric Company Limited, London, England, a British company Application August 31, 1953, Serial No. 377,659

Claims priority, application Great Britain September 8, 1952

5 Claims. (Cl. 64—17)

The invention relates to flexible drives such as used between the prime mover or gear box fixed to the frame of a locomotive and the driven axle thereof, wherein a gimbal member is slidably guided with radial pins in respect of two pairs of links, the members of each pair lying diametrically opposite one another, and the two pairs being arranged angularly offset with respect to one another, one pair of these links being resiliently connected to the ends of a double arm of the driving member, and the other pair of these links being resiliently connected to the ends of a double arm of the driven member, whereby any movement perpendicular to the axis of rotation of the driven member with respect to the driving member is taken up by the sliding of the gimbal member with respect to either the one or the other pair of links or both simultaneously according to the angular position of said links with respect to the direction of said movement. Such a flexible drive will be called hereinafter for brevity "a flexible drive of the kind referred to."

According to the invention the resilient connection of said links to the driving arm and to the driven arm, respectively, of a flexible drive of the kind referred to is effected by means of assemblies of rubber bonded discs having their outer plates located in the links, and their inner plates located on a hollow pin which fits with a tapering end into a conical recess in the arm to which it is tied by a threaded bolt passing through the said hollow pin, and by a nut, the axes of the assemblies of rubber bonded discs being parallel to the axis of rotation of the flexible drive.

Preferably there are two such assemblies arranged in each link symmetrically on both sides of the radial gimbal pin, and these links are so arranged that the plane perpendicular to the axis of rotation of the flexible drive containing the centre lines of the radial gimbal pins passes substantially through the middle of the length of the assemblies of rubber bonded bushes, and the axes of these assemblies lie preferably on a circle passing substantially through the middle of the radial length of these pins.

The wear and tear caused by the sliding under torque load of the gimbal pins relative to the links is taken by slide bearing sleeves which may be fixed in the links or preferably on the gimbal pins, and which can be withdrawn radially outward with respect to the axis of rotation of the flexible drive from the radial bores provided for them in each link. When such a sleeve is withdrawn and the nuts and tie bolts are removed from each assembly of rubber bonded discs, the link can be moved axially through the thickness of the sleeve whereby the tapering ends of the hollow pins are partly withdrawn from their conical seats in the driving or driven arm. When the gimbal ring is then tilted about its two other pins which are on a diameter at a right angle to the pin with which the link to be dismantled is associated, the conical ends of the hollow pins completely clear their seats in the respective arm, and the link can be removed in the radial direction.

In order that the invention may be better understood and readily carried into effect, an embodiment thereof will now be described by way of example with reference to the accompanying drawings in which.

Figure 1:
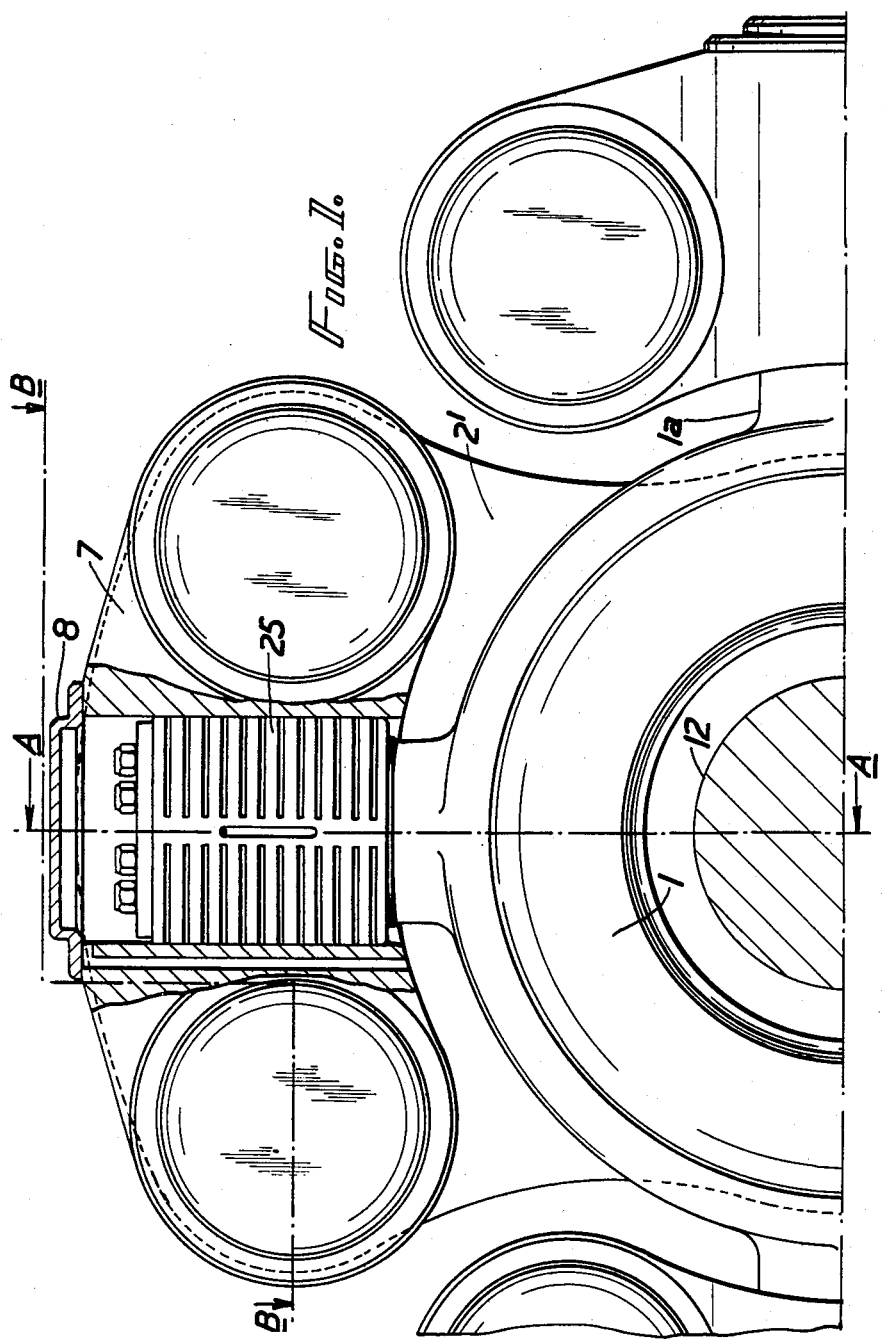
Fig. 1 is a part end view.
Figure 2:
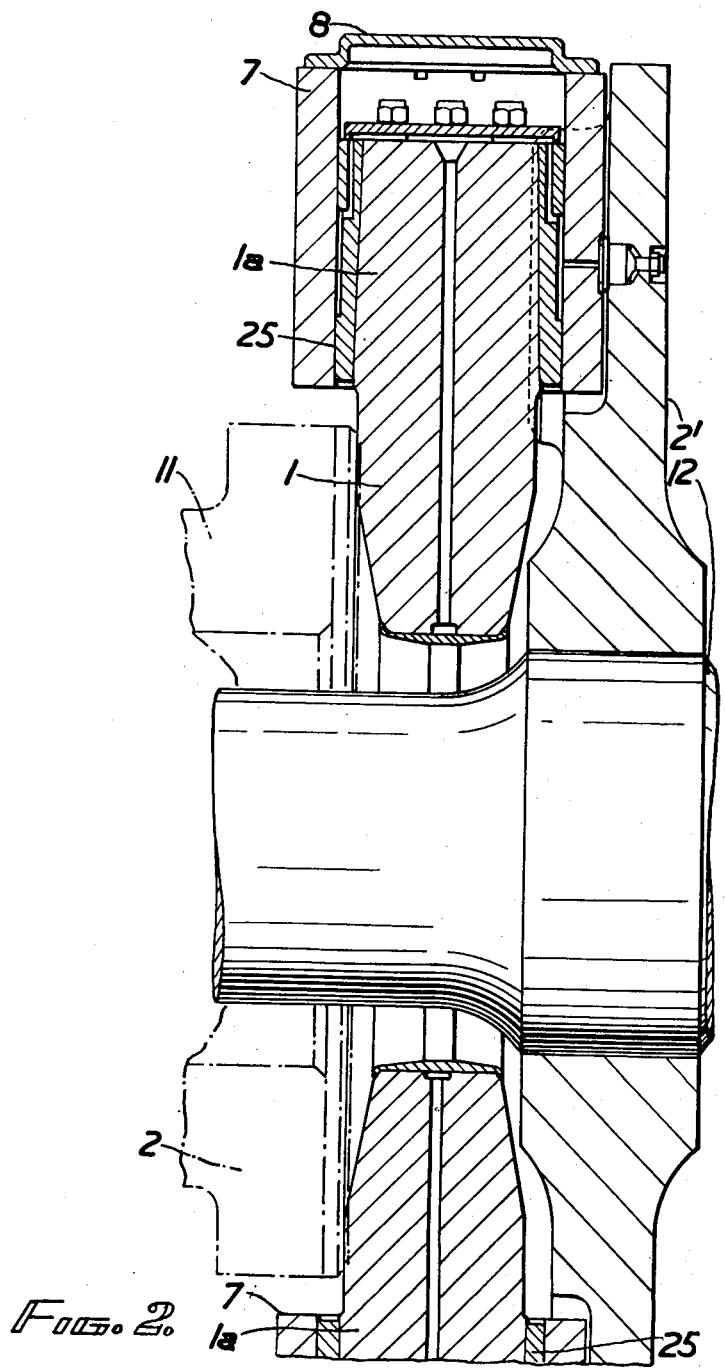
Fig. 2 is a longitudinal part-section along the line A—A of Fig. 1.

The gimbal ring 1 has two pairs of radial pins 1a lying on diameters at right angles to one another. On each pin a sleeve 25 is attached on a conical seat, and each sleeve is slidable in a radial bore of a link 7. Each link has two cylindrical bores parallel to the axis of rotation arranged symmetrically to the radial bore, the mean radii and middle planes of rotation of the said bores parallel to the axis of rotation being substantially the same as those of the said radial bores in the links. The latter are closed by caps 8.

Figure 3:
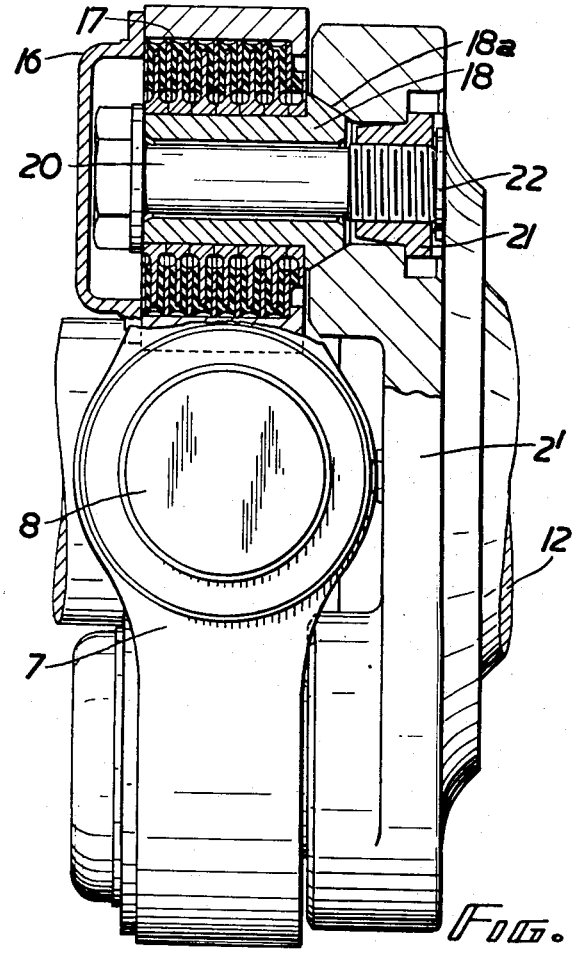
Fig. 3 is a view partly in section, in the direction B—B of Fig. 1.

In the centre of each of the said bores parallel to the axis of rotation a hollow pin 18 (Fig. 3) is arranged, the tapering end 18a of which is seated in a conical recess of the driving arm 2 or driven arm 2', respectively. A threaded tie bolt 20 and nut 21 attach each hollow pin 18 to its associated arm.

The bolt 20 has a cylindrical extension 23 (Figs. 4 and 5) of a diameter smaller than the minor diameter of its screw thread, and between the end of the latter and the said extension a square portion 24 is provided the diagonal of which is smaller than the minor diameter of the screw thread but larger than the diameter of the cylindrical extension 23. A shallow groove 25 separates the square portion 24 from the cylindrical extension 23. A tapped hole 26 is arranged in the end of the bolt 20.

The nut 21 has diametrical slots 27 on its face, and a lock plate 22 has an inner bore affording clearance fit over the cylindrical extension 23, and two diametrically opposite tabs 28 fitting into the slots 27 on the face of the nut 21.

A washer 29 has a recess 30 facing the cylindrical extension 23 and of a clearance fit over the same. A set screw 31 can be screwed into the tapped hole 26 of the bolt 20.

In operation, the nut 21 is tightened on the bolt 20 to the degree desired. The lock plate 22 is put on the cylindrical extension 23, and with its tabs 28 registering with one of the diametrical slots 27 of the nut 21. The washer 29 is applied with its recess 30 facing the cylindrical extension 23, and the set screw 31 is tightened, whereby the lock plate 22 is driven with its tabs 28 into the slots 27 on the face of the nut 21, while the corners of the square portion 24 cut into the inner part of said lock plate 22. The metal of the lock plate 22 displaced by these corners is forced into the shallow groove 25.

The lock nut arrangement is thus locked in the relative angular position of nut and bolt selected at will. The set screw 31 and the washer 29 are then removed.

Figures 4, 5:
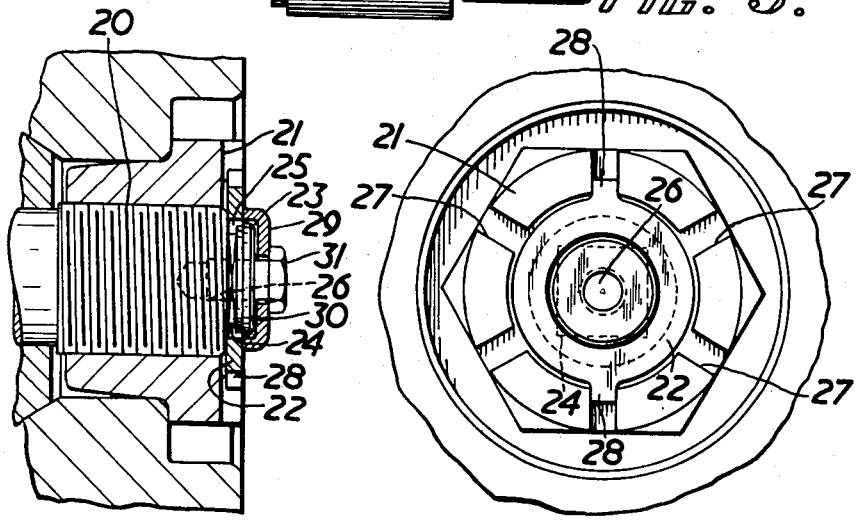
Figs. 4 and 5 are a longitudinal section and end view, respectively, of a detail, on a larger scale.

As will be seen in Fig. 4 the locking plate 22 rests at a certain distance from the bottom of the slots 27 in the face of the nut 21. The locking plate can accordingly be pulled out and removed by means of a tool engaging into the gaps between the ends of the tabs 28 and the bottom of the slots 27. The locking plate 22 can be used twice again if desired, when turned 60° relative to the position previously occupied, so that its tabs 28 engage another pair of slots 27 and the corners of the square portion 24 cut into other points of the inner circumference of the locking plate 22 as before. When the locking plate 22 has eventually to be replaced by a new one, it constitutes merely a small and inexpensive item.

Rubber bonded discs 17 (Fig. 3) are filed with their inner plates on the hollow pin 18 and held there between a shoulder of the tapering end 18a and the head of the tie bolt 20. The outer plates of the rubber bonded discs 17 are located between an inner flange of the link 7 and a cap 16.

In operation, radial relative movements between the driving arm 2, which may be connected to the tubular end shaft 11 of the reduction gear of a locomotive, and the driven arm 2', which may be connected to a locomotive axle 12, are permitted by radial sliding of the pins 1a of the gimbal member 1 in the links 7, according to the angular position of the said gimbal member relative to the direction of these radial movements.

Angular misalignment of the driving and driven members is taken care of by tilting movements about these pins 1a, also according to the angular position of the gimbal member.

Torque is transmitted from the driving arm through pins 18, rubber bonded discs 17 (the rubber being stressed in shear), one pair of links 7, their associated gimbal pins 1a, gimbal ring 1 to the other pair of gimbal pins 1a, the other pair of links 7, their rubber bonded discs 17 and pins 18 to the driven arm 2'.

The stiffness of the rubber bonded discs 17 in shear allows the same to resist also centrifugal loading with a comparatively small resultant radial movement of the links 7 relative to the arms 2, 2'.

As the space in the direction of the axis of rotation is usually rather limited in locomotives, it is of advantage to be able to dismantle the links 7 in the radial direction. For this purpose the cap 8 of the radial bore in the link is removed, the sleeve 25 is withdrawn through this bore after having been detached from its conical seat on the pin 1a, the caps 16, nuts 21 and tie bolts 20 are removed, and the whole link 7 is moved axially away from the respective arm 2 or 2' about half the depth of the conical recesses for the tapered ends 18a of the hollow pins 18. The gimbal ring 1 is then tilted about the diameter perpendicular to that of the pin 1a the link of which is being dismantled, whereby the tapered ends 18a get clear of their conical seats. The whole link 7 can then be removed in a radial direction. The assembling of the links to the flexible drive is effected in the reverse order.

What I claim as my invention and desire to secure by Letters Patent is:

1. In a flexible drive having a driving member, a driven member and a gimbal member, all arranged coaxially with one another, and radial gimbal pins fixedly arranged on the said gimbal member, in combination: links each having a radial bore slidable on one of the said gimbal pins and bores parallel to the axis of rotation of the flexible drive, assemblies of rubber bonded discs each assembly having a hollow pin and outer plates located in a bore of a link parallel to the said axis of rotation, inner plates located on said hollow pin, a threaded bolt passing through said hollow pin, and a nut screwed on the said threaded bolt, the said hollow pin fitting with a conical end into a conical recess of the associated driving member and driven member, respectively, and being tied thereto by the said threaded bolt and nut.

2. In a flexible drive, the combination as claimed in claim 1 comprising in addition: slide bearing sleeves fitted over the said gimbal pins fixed thereto in operation and removable radially outward with respect to the axis of rotation of the said drive.

3. In a flexible drive, the combination as claimed in claim 1, comprising in addition: a cylindrical extension of the threaded end of the said bolt having a diameter smaller than the core of the thread, an angular portion having a circumscribed circle of a diameter larger than that of the said extension and smaller than that of the core of the thread, arranged between the said threaded end and the said extension, and a lock plate of a comparatively plastic material with a bore slidably fitting over the said extension and having radially extending tabs fitting into corresponding slots provided on the free face of the said nut, the said lock plate locking the said nut to the said bolt in any position of tightening the said nut and bolt when axially forced into engagement with the corners of the said angular portion of the said bolt.

4. In a flexible drive, the combination as claimed in claim 1 wherein two of the said assemblies of rubber bonded discs are arranged in each link in bores parallel to the said axis of rotation, disposed symmetrically on both sides of the associated radial gimbal pin, and wherein the plane perpendicular to the axis of rotation of the flexible drive containing the center lines of the said radial gimbal pins passes substantially through the middle of the length of the said assemblies of rubber bonded discs.

5. In a flexible drive, the combination as claimed in claim 1 wherein two of the said assemblies of rubber bonded discs are arranged in each link in bores parallel to the said axis of rotation, disposed symmetrically on both sides of the associated radial gimbal pin, and wherein the axes of the said assemblies of rubber bonded discs lie on a circle passing substantially through the middle of the radial length of the said gimbal pins.

References Cited in the file of this patent

UNITED STATES PATENTS 2,554,739  Hughes _____ May 29, 1951